CIRCUIT ARRANGEMENT FOR USE IN TELEVISION RECEIVERS AND INTENDED FOR FILTERING OUT NOISE SIGNALS

Filed Dec. 12, 1955

INVENTORS
PETER JOHANNES HUBERTUS JANSSEN
WOUTER SMEULERS
BY [signature]
AGENT

United States Patent Office 2,885,474
Patented May 5, 1959

2,885,474

CIRCUIT ARRANGEMENT FOR USE IN TELEVISION RECEIVERS AND INTENDED FOR FILTERING OUT NOISE SIGNALS

Peter Johannes Hubertus Janssen and Wouter Smeulers, Eindhoven, Netherlands, assignors, by mesne assignments, to North American Philips Company, Inc., New York, N.Y., a corporation of Delaware Application December 12, 1955, Serial No. 552,623

Claims priority, application Netherlands December 17, 1954

3 Claims. (Cl. 178—7.5)

Figure 2:
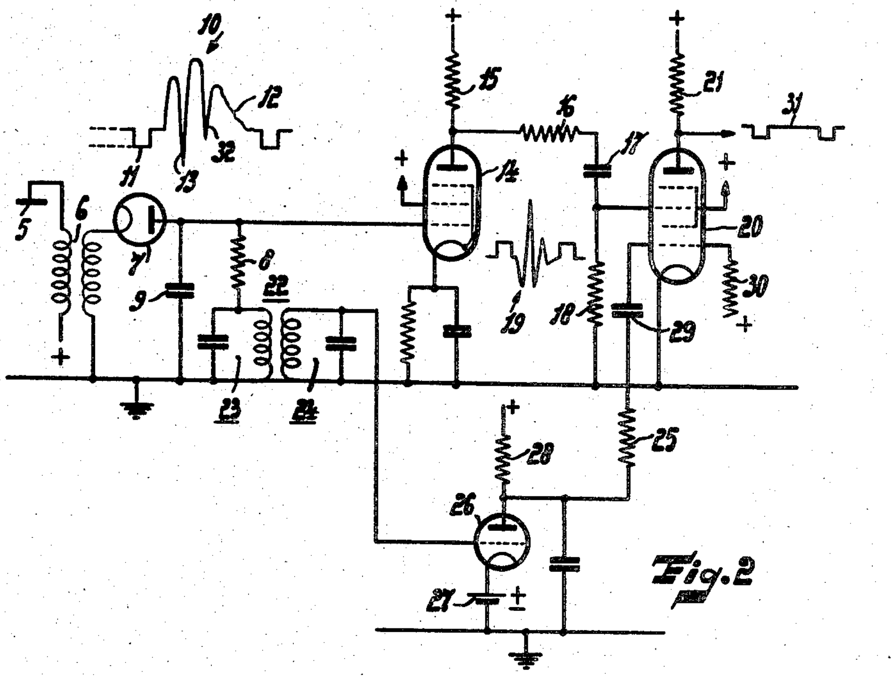

This invention relates to circuit arrangements for use in television receivers and intended for filtering out noise signals.

When receiving positively modulated television signals strong noise signals produce, as is known, white spots on the picture screen of the receiver, which spots often are very annoying. In receiving negatively modulated television signals, the noise signals give rise to the production of black spots in the reproduced picture, which is usually not annoying. However, this method of modulation has another disadvantage in that the noise signals adversely affect synchronisation of the deflection means of the receiver. In synchronizing the line deflection means said disadvantage can be greatly reduced by employing automatic frequency control ("flywheel synchronisation") but in synchronizing the picture deflection means the use of automatic frequency control is not conveniently possible, so that direct synchronization is usually employed and much trouble is experienced from spark noise or the like.

Both in receivers for positive and for negative modulation many circuit arrangements have been proposed by means of which it is sought to separate the noise signal from the incoming signal.

In the case of positive modulation, the control signal for the picture tube, which signal still contains the noise, is combined with the separated noise signal in such manner that practically compensation of the noise occurs ("black spotter"). In negative modulation, the synchronisation signal still containing the noise is combined with the separated noise signal in such manner that also noise compensation practically occurs ("noise inverter"). It will be obvious that the degree of success of the aforesaid steps largely depends upon the degree to which the obtained separated noise signal corresponds to the actual noise signal. In the hitherto known circuit arrangements said conformity leaves much to be desired, at least too much for obtaining satisfactory results. In negative modulation, for example, it is known to separate the noise signals by amplitude selection, in which case those signal amplitudes are selected which exceed the amplitude of the peaks of the synchronisation pulses. Said amplitude selection requires in itself a comparatively intricate circuit arrangement and otherwise it is ineffective, since there are also noise signals, the amplitude of which is smaller than the peaks of the synchronisation pulses but larger than the amplitude of the black level. On the one hand, in amplitude selection, no information is obtained about said noise signals but on the other hand they occur within the amplitude range of the synchronisation pulses and adversely affect synchronisation.

The circuit arrangement in accordance with the invention has for its object to improve the separation of noise signals and has the feature that the video-frequency portion of the receiver comprises selection means for passing a frequency band within the frequency band of the television signal to be reproduced, the maximum acceptance of the selection means being at least three times as high as the acceptance for the first twenty harmonics of the synchronisation pulses.

The circuit arrangement in accordance with the invention is based on the following realisation. Those disturbances, which either in positive or in negative modulation, have the aforesaid annoying consequence, generally comprise a large number of components, the frequencies of which are divided over a wide band which, in general, is considerably wider than the pass-band of a television receiver. On the average, those Fourier-components of a disturbance, which are within the pass-band of the television receiver, will little differ in amplitude. On the other hand it is known that the major picture information in a television band is within a frequency band extending from the image carrier to a frequency which is 0.5 mc./s. to 1 mc./s. different therefrom. In the remaining part of the picture sideband, that is to say from 0.5 mc./s. to 1 mc./s. to the highest side-band frequency, the amplitudes of the picture signals are only small.

Hence, on the appearance of a disturbance the noise information will far exceed the picture information in the last-mentioned frequency band or in the corresponding part of the video-frequency band. At the output of the selection means for filtering out the frequency band concerned, those frequency components of the disturbance occur, which are within the selected band. In the receiver noise occurs, it is true, as a result of a larger number of frequency components, namely also of those within the non-selected part of the video frequency band, but this only means that the separated noise signal will have a somewhat less steep wave form than that of the actually present noise signal, since the separated noise signal is derived from the selection means with a smaller band-width.

In negative modulation, as has been stated, the separated noise signal is sometimes added to the synchronisation signal in such manner that the separated noise signal is in phase-opposition to the noise occurring in the synchronisation signal. Provision is then to be made that the separated noise signal contains little or no information about the synchronisation signals, since such information would be combined in phase-opposition with the synchronisation signals, so that the ultimate synchronisation signals would be distorted. Hence, the band filtered out by the selection means should not extend to that part of the video-frequency band which contains the fundamental frequency of the synchronisation signals and its paramount higher harmonics. In the various television systems, the repetition frequency of the line-synchronisation pulses is approximately 10,000 c./s. to 20,000 c./s. and the duration of said pulses is approximately one tenth of the period. If, in this case, the first twenty harmonics are not passed, or passed heavily damped by the selection means, the output of the selection means will comprise little or no information about the synchronisation signals.

It is still possible that some information about the picture signals occurs at the output of the selection means. In the case of negative modulation, however, this is not troublesome since the separated signal is added in phase-opposition to the synchronisation signal, with a view to retaining only the synchronisation signals and suppressing any noise or other phenomena occurring between the synchronisation pulses. Any picture information in the separated noise signal does not, however, occur during the appearance of synchronisation pulses when, of course no picture information is transmitted. As a result thereof the ultimate synchronisation signal is not disturbed by any picture components occurring in the separated noise signal.

In positive modulation, the separated noise signal is combined with the picture signal in such manner that the separated noise signal is in phase-opposition to the noise of the picture signal. Provision is then to be made that the separated noise signal contains little or no picture information, since otherwise the latter would be added in phase-opposition to the desired picture information. Now the picture information in a television sideband is concentrated around the picture carrier and around the harmonics of the line frequency and generally that is to say in most pictures, this amplitude of the picture signal decreases rapidly with an increase in sideband frequency.

Consequently, the selected band comprises only picture components having a comparatively small amplitude in comparison with the amplitude of the noise components occurring in said band. Moreover, these are the picture components of higher frequency. The whole detected signal obtained through the selection means can be used as a compensation signal, which consequently results in that the picture components of high frequency fail in the ultimate picture. Preferably, however, such a bias will be used in detecting the output voltage of the selection means that the picture components substantially fail in the detected signal.

In virtue of the aforesaid recognition it has been suggested to use the selection means in the intermediate frequency part of a television receiver. Such television receivers have given excellent results, except in receiving television signals in exceedingly high frequency bands of 200 mc./s. and higher, since then the range of the receiver tuning means is generally considerable so that the frequency of the local oscillator of the receiver may depart more than 1 mc./s. and even more than 2 mc./s. from the correct value. As a result, the intermediate frequency band of the incoming signal shifts by the same amount relatively to the intermediate frequency pass-band of the receiver and also relatively to the pass-band of the intermediate frequency selection means for filtering out the noise signals. Hence, the first twenty harmonics of the synchronisation signals and the picture carrier or, on the other hand, the associated sound carrier and signals from a television transmitter in an adjacent channel will lie within the pass-band of the selection means, which may, for example, lead to failure of the synchronisation signal. In accordance with the present invention such difficulties are avoided when using the selection means in the video-frequency part of the receiver.

The circuit arrangement in accordance with the present invention consequently has the advantage that it operates satisfactorily and independently of the tolerance of the tuning means of the receiver.

Figure 3:
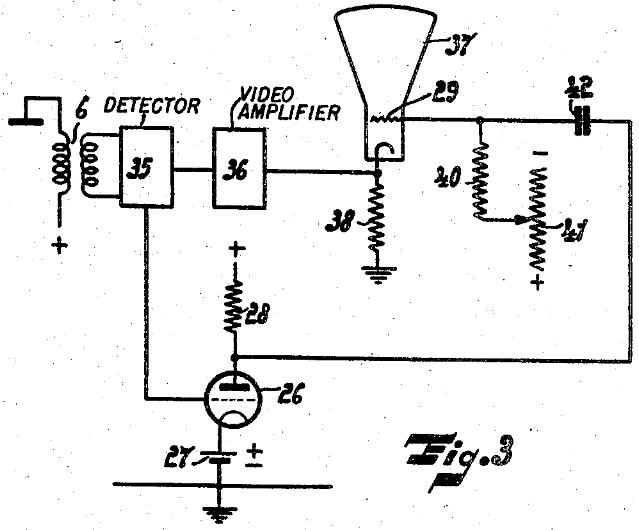
Figure 1:
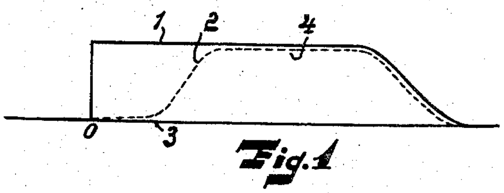

In order that the invention may be readily carried into effect it will now be described with reference to the accompanying drawing, given by way of example, in which Fig. 1 shows diagrammatically the video band of a television receiver and a band filtered out by the selection means, Fig. 2 shows one form of the circuit arrangement in accordance with the invention for use in a receiver for negative modulation, and Fig. 3 shows one form of the circuit arrangement in accordance with the invention for use in a receiver for positive modulation.

In Fig. 1, the solid curve 1 represents the transmission characteristic of the video frequency part of a television receiver, which characteristic extends from 0 mc./s. to approximately 5 mc./s. The dotted curve 2 represents the transmission curve of the selection means, the form of which at the side of the high frequencies is, in this instance, practically equal to that of the transmission characteristic 1. This, however, is unessential. The vital thing is that the acceptance for the first twenty or still more harmonics of the synchronisation pulses be at least three times as low as the maximum acceptance and, on the other hand, the bandwidth of the selection means be sufficient to pass an adequate number of harmonics of the noise.

In Fig. 1, the acceptance for the first forty harmonics of the synchronisation pulses, which are situated at the left of point 3 on the abscissa, is at least ten times as low as the maximum acceptance, for example at point 4.

In Fig. 2, the anode of the last intermediate frequency amplifier tube of a receiver for negative modulation is denoted by 5. In this figure, only those receiver parts are shown which are necessary for a clear understanding of the invention. The parts not shown may all be of known type. The anode 5 is coupled through a transformer 6 to the cathode of a detector diode 7. In the anode circuit of the diode 7, the video signal of the form denoted by 10 is produced across the parallel-combination of a resistor 8 and a capacitor 9 with negatively directed synchronisation pulses 11, positively directed picture signal 12 and negatively directed noise pulses 13 and 32. This signal is supplied to the control grid of a tube 14, whilst the signal designated by 19 and occurring across the resistor 18 is derived from the anode resistor 15 by way of a resistor 16, capacitor 17 and resistor 18. Said signal 19 is supplied to the second control grid of a multigrid tube 20 in the form of a hexode. If the first control grid of tube 20 has cathode potential then peak detection will occur in known manner at the second control grid of tube 20.

If the supplied signal 19 does not comprise noise impulses the peaks of the synchronisation pulses will assume a level which is slightly positive relatively to the cathode, due to the said peak detection at the second control grid of tube 20.

On the occurrence of a noise pulse a grid current pulse will appear at the second control grid, it is true, but the latter pulse is small since the grid current characteristic of the second control grid is substantially flat after exceeding a given value. As a result thereof the voltage across the capacitor 17 varies only slightly so that no synchronisation pulses are absent in the output circuit of the tube 20.

However, the noise pulses would still occur in said output circuit, for example, across the anode resistor 21. It is to be noted that the circuit arrangement so far described has already been proposed. Furthermore, it has been proposed to apply to the first control grid of tube 20 a voltage cutting off the tube upon the occurrence of noise pulses. To this end, in one embodiment of the invention, the output circuit of the diode 7 comprises a band-pass filter 22 having a transmission characteristic represented by the dotted curve 2 shown in Fig. 1. In the circuit arrangement shown in Fig. 2 the input circuit 23 of said bandpass filter is connected in series with resistor 8. The secondary circuit 24 of the bandpass filter 22 is connected in the control grid circuit of a tube 26 connected as an anode detector. For this purpose, the cathode circuit comprises a bias source 27 permitting adjustment in known manner to a point in the lower part of the anode-current versus grid-voltage characteristic of the tube. The detected and amplified noise signal occurs with negatively directed noise pulses across the anode resistor 28. Said noise signal is supplied to the first control grid of the hexode 20 via the series-combination of resistor 25 and capacitor 29. On the occurrence of noise signals the anode current of the hexode is interrupted so that substantially no noise pulses occur across the anode resistor 21 and the synchronisation signal designated 31 can be taken from this resistor. In order to avoid that any picture- and synchronisation signals occurring across the output circuit 24 of the band-pass filter 22 might affect the first control grid of the tube 20 a positive voltage is applied to this control grid via the resistor 30.

In Fig. 3, which represents a receiver for positive modulation, parts corresponding to those of the circuit arrangement shown in Fig. 2, are provided with the same reference numerals. The picture signal now modulated in positive sense on the intermediate frequency carrier is supplied through the transformer 6 to a detector 35 in series with a video amplifier 36. The output signal of the amplifier 36 is supplied to the cathode of the picture tube 37 via the cathode resistor 38. Across this cathode resistor 38 the signal with positively directed synchronisation pulses and negatively directed picture components and noise pulses occurs.

On the occurrence of a noise pulse the potential of the cathode is consequently reduced relatively to the potential of the control grid 39 of the picture tube. The control grid 39 is connected, through a resistor 40, to an adjustable tapping of a potentiometer 41 which is connected to a suitable supply.

The separated noise signal with negatively directed noise pulses is taken from the anode resistor 28 of the anode detector 26. Said noise pulses are supplied through the capacitor 42 to the control grid 39.

Hence, on the appearance of a noise pulse not only the potential of the cathode of the picture tube but also the potential of the control grid is reduced with the result that the influence of the noise pulse is substantially reduced to zero. It is pointed out that, when using the normal bias of the source 27 for anode detection, picture components of high frequency will also be detected which consequently likewise occur at the control grid 39 and, hence, will compensate the corresponding picture components occurring across the cathode resistor 38. The bias of the source 27 is preferably so chosen that the working point of the triode 26 is shifted slightly beyond the cut-off point of the characteristic, hence the picture components of small amplitude across the circuit 24 are not detected by the triode 26.

What is claimed is:

1. A noise eliminating circuit for use in television receivers, comprising a source of television signals having a given bandwidth and containing line and field synchronizing pulses and subject to having noise signals included therein, a signal mixing device, means for feeding said television signals having a given bandwidth as a continuous first input signal to said mixing device, and means including a selection means connected to feed a portion of said television signals as a second input signal to said mixing device with a phase to cause cancellation of said noise signals in said mixing device, said selection means having a bandpass characteristic for passing a frequency band lying within the bandwidth of said television signal and passing frequencies higher than the first twenty harmonics of said line synchronizing pulses with an amplitude at least three times as great as that of the frequencies of said first twenty harmonics.

2. A circuit as claimed in claim 1, in which said television signals are modulated in a negative sense, said mixing device comprising an electron tube having first and second input electrodes and an output electrode, said first input signal being applied to said first input electrode with a polarity to render said tube conductive during said synchronizing pulses, and including a detector connected between said selection means and said second input electrode to feed a detected signal to said second input electrode with a polarity to cause said noise signals to cut off said tube, and means connected to derive said synchronizing pulses from said output electrode.

3. A circuit as claimed in claim 1, in which said television signals are modulated in a positive sense, said mixing device comprising a picture display tube having first and second electron-beam control electrodes, said first input signal being applied to said first control electrode with a polarity whereby said noise signals control said electron beam in a given sense, and including a detector between said selection means and said second control electrode to feed a detected signal to said second control electrode with a polarity whereby said noise signals control said electron beam in a sense opposite to said given sense.

References Cited in the file of this patent

FOREIGN PATENTS 685,483 Great Britain ------------ June 7, 1953